United States Patent
Noda et al.

(10) Patent No.: US 11,104,401 B2
(45) Date of Patent: Aug. 31, 2021

(54) HUMAN-POWERED VEHICLE DRIVE UNIT

(71) Applicant: Shimano Inc., Osaka (JP)

(72) Inventors: Shinichiro Noda, Osaka (JP);
Tomoyuki Iiboshi, Osaka (JP);
Takaaki Fujiwara, Osaka (JP);
Akihiro Izawa, Osaka (JP)

(73) Assignee: Shimano Inc., Osaka (JP)

( * ) Notice: Subject to any disclaimer, the term of this patent is extended or adjusted under 35 U.S.C. 154(b) by 201 days.

(21) Appl. No.: 16/413,130

(22) Filed: May 15, 2019

(65) Prior Publication Data

US 2019/0367127 A1 Dec. 5, 2019

(30) Foreign Application Priority Data

May 30, 2018 (JP) .............................. JP2018-103814

(51) Int. Cl.
| | | |
|---|---|---|
| *F16H 37/06* | (2006.01) | |
| *B62M 6/55* | (2010.01) | |
| *B62M 6/50* | (2010.01) | |
| *B62M 6/80* | (2010.01) | |
| *B62M 11/02* | (2006.01) | |
| *F16H 1/20* | (2006.01) | |
| *B62J 99/00* | (2020.01) | |

(Continued)

(52) U.S. Cl.
CPC ............... *B62M 6/55* (2013.01); *B62J 99/00* (2013.01); *B62M 6/50* (2013.01); *B62M 6/80* (2013.01); *B62M 11/02* (2013.01); *F16H 1/20* (2013.01); *B62J 45/00* (2020.02); *B62J 45/40* (2020.02)

(58) Field of Classification Search
CPC .. B62M 6/55; B62M 6/50; B62J 99/00; F16H 1/20
See application file for complete search history.

(56) References Cited

U.S. PATENT DOCUMENTS 4,410,060 A * 10/1983 Cunard ................... B62M 6/55
180/11
5,909,781 A * 6/1999 Yonekawa ............... B62M 6/45
180/206.4

(Continued)

FOREIGN PATENT DOCUMENTS

| EP | 2 910 462 A1 | 8/2015 |
| GN | 201678014 U | 12/2010 |

(Continued)

*Primary Examiner* — Jake Cook
(74) *Attorney, Agent, or Firm* — Global IP Counselors, LLP

(57) ABSTRACT

A human-powered vehicle drive unit that reduces loss of human driving force includes an electric motor, a crankshaft, an output portion, a speed reducer, and a clutch. The electric motor is configured to assist in propulsion of a human-powered vehicle. The output portion is coupled to the crankshaft. The speed reducer reduces a rotational speed of the electric motor in multiple steps. The clutch is provided between the output portion and the speed reducer. In a case in which the crankshaft rotates in a first rotational direction, the output portion is configured to rotate in the first rotational direction. In a case in which the crankshaft rotates in a second rotational direction, the output portion is configured to rotate in the second rotational direction. The clutch is configured to transmit a rotational force of the electric motor to the output portion from the speed reducer.

15 Claims, 10 Drawing Sheets

(51) Int. Cl.
  *B62J 45/00* (2020.01)
  *B62J 45/40* (2020.01)

(56) References Cited

U.S. PATENT DOCUMENTS

| | | |
|---|---|---|
| 9,227,694 B2 * | 1/2016 | Hino ..................... B62M 6/55 |
| 9,616,969 B2 | 4/2017 | MacMartin |
| 9,834,278 B2 * | 12/2017 | Uda ..................... B62M 11/02 |
| 2014/0166384 A1 | 6/2014 | Ishida et al. |
| 2016/0288872 A1 * | 10/2016 | Shahana ............. B62K 25/286 |
| 2017/0334512 A1 * | 11/2017 | Capozzella ............ B62M 6/45 |

FOREIGN PATENT DOCUMENTS

| | | | |
|---|---|---|---|
| GN | 105164011 | A | 12/2015 |
| JP | 9-95289 | A | 4/1997 |
| JP | 4022964 | B2 | 12/2007 |
| JP | 4906982 | B1 | 3/2012 |
| JP | 5202769 | B1 | 6/2013 |
| JP | 2014-196036 | A | 10/2014 |
| JP | 6267433 | B2 | 1/2018 |

* cited by examiner

HUMAN-POWERED VEHICLE DRIVE UNIT

CROSS-REFERENCE TO RELATED APPLICATIONS

This application claims priority to Japanese Patent Application No. 2018-103814, filed on May 30, 2018. The entire disclosure of Japanese Patent Application No. 2018-103814 is hereby incorporated herein by reference.

BACKGROUND

Technical Field

The present invention generally relates to a human-powered vehicle drive unit.

Background Information

Japanese Patent No. 4906982 (Patent document 1) discloses one example of a human-powered vehicle drive unit including an electric motor that assists in propulsion of a human-powered vehicle. Human driving force that is input to the crankshaft and rotational force of the electric motor are input to an output portion. The electric motor is configured to transmit the rotational force to the output portion via a speed reducer.

SUMMARY

In the human-powered vehicle drive unit disclosed in Japanese Patent No. 4906982, even in a case in which the electric motor is deactivated, human driving force is transmitted to the speed reducer and the electric motor. This increases loss of the human driving force due to rotational resistance of the speed reducer and the electric motor.

One object of the present disclosure is to provide a human-powered vehicle drive unit that reduces loss of human driving force.

A human-powered vehicle drive unit according to a first aspect of the present disclosure comprises an electric motor, a crankshaft, an output portion, a speed reducer, and a clutch. The electric motor is configured to assist in propulsion of a human-powered vehicle. The output portion is coupled to the crankshaft. The speed reducer is configured to reduce a rotational speed of the electric motor in multiple steps. The clutch is provided between the output portion and the speed reducer. The output portion is configured to rotate in the first rotational direction in a case in which the crankshaft rotates in a first rotational direction. The output portion is configured to rotate in the second rotational direction in a case in which the crankshaft rotates in a second rotational direction. The clutch is configured to transmit a rotational force of the electric motor to the output portion from the speed reducer.

With the human-powered vehicle drive unit according to the first aspect, the clutch is provided between the output portion and the speed reducer. Thus, in a case in which the electric motor is deactivated, human driving force will not be transmitted toward the electric motor from the output portion. This reduces loss of human driving force. Additionally, in a case in which the crankshaft is rotated in any one of the first rotational direction and the second rotational direction, the rotation of the crankshaft is transmitted to the output portion.

In accordance with a second aspect of the present disclosure, the human-powered vehicle drive unit according to the first aspect is configured so that the speed reducer includes a first gear provided on an output shaft of the electric motor and a second gear engaged with the first gear.

With the human-powered vehicle drive unit according to the second aspect, the first gear and the second gear simplify the structure of the speed reducer.

A human-powered vehicle drive unit according to a third aspect of the present disclosure comprises an electric motor, a crankshaft, an output portion, a speed reducer, and a clutch. The electric motor is configured to assist in propulsion of a human-powered vehicle. The output portion is coupled to the crankshaft. The speed reducer is configured to reduce a rotational speed of the electric motor in multiple steps. The clutch is provided between the output portion and the speed reducer. The clutch is configured to transmit a rotational force of the electric motor from the speed reducer to the output portion. The speed reducer includes a first gear provided on an output shaft of the electric motor and a second gear engaged with the first gear.

With the human-powered vehicle drive unit according to the third aspect, the clutch is provided between the output portion and the speed reducer. Thus, in a case in which the electric motor is deactivated, human driving force will not be transmitted toward the electric motor from the output portion. This reduces loss of human driving force. Additionally, the first gear and the second gear simplify the structure of the speed reducer.

In accordance with a fourth aspect of the present disclosure, the human-powered vehicle drive unit according to the third aspect further comprises a one-way clutch provided on a transmission path of human driving force between the crankshaft and the output portion.

With the human-powered vehicle drive unit according to the fourth aspect, in a case in which the crankshaft rotates in the second rotational direction, the rotation will not be transmitted to the output portion.

In accordance with a fifth aspect of the present disclosure, the human-powered vehicle drive unit according to any one of the first to fourth aspects is configured so that the clutch includes a one-way clutch.

With the human-powered vehicle drive unit according to the fifth aspect, the one-way clutch appropriately transmits rotational force of the electric motor from the speed reducer to the output portion.

In accordance with a sixth aspect of the present disclosure, the human-powered vehicle drive unit according to the fifth aspect is configured so that the speed reducer further includes a third gear provided on an outer circumferential portion of the one-way clutch and a fourth gear engaged with the third gear.

With the human-powered vehicle drive unit according to the sixth aspect, the third gear and the fourth gear simplify the structure of the speed reducer.

In accordance with a seventh aspect of the present disclosure, the human-powered vehicle drive unit according to any one of the second to fourth aspects is configured so that the clutch includes a one-way clutch. The speed reducer further includes a third gear provided on an outer circumferential portion of the one-way clutch and a fourth gear engaged with the third gear. The output portion and the third gear are configured to rotate about a first rotational axis. The output shaft of the electric motor and the first gear are configured to rotate about a second rotational axis that is parallel to the first rotational axis. The second gear and fourth gear are configured to rotate about a third rotational axis that is parallel to the first rotational axis and the second rotational axis. The first rotational axis, the second rotational axis, and the third rotational axis are coplanar with each other.

The human-powered vehicle drive unit according to the seventh aspect is easily reduced in size in a direction that intersects with a plane including the first rotational axis, the second rotational axis, and the third rotational axis.

In accordance with an eighth aspect of the present disclosure, the human-powered vehicle drive unit according to any one of the second to fourth aspects is configured so that the clutch includes a one-way clutch. The speed reducer further includes a third gear provided on an outer circumferential portion of the second one-way clutch and a fourth gear engaged with the third gear. The output portion and the third gear are configured to rotate about a first rotational axis. The output shaft of the electric motor and the first gear are configured to rotate about a second rotational axis that is parallel to the first rotational axis. The second gear and the fourth gear are configured to rotate about a third rotational axis that is parallel to the first rotational axis and the second rotational axis. The third rotational axis is separated from a plane that includes the first rotational axis and the second rotational axis.

The human-powered vehicle drive unit according to the eighth aspect is easily reduced in size in a direction along a plane including the first rotational axis and the second rotational axis and orthogonal to the first rotational axis and the second rotational axis.

In accordance with a ninth aspect of the present disclosure, the human-powered vehicle drive unit according to the seventh or eighth aspect is configured so that a shortest distance between the first rotational axis and the second rotational axis is greater than a shortest distance between the first rotational axis and the third rotational axis.

With the human-powered vehicle drive unit according to the ninth aspect, the rotational axis of an intermediate gear of the speed reducer is located in a region between the first rotational axis and the third rotational axis.

In accordance with a tenth aspect of the present disclosure, the human-powered vehicle drive unit according to any one of the seventh to ninth aspects is configured so that the third gear is offset from the electric motor as viewed in a direction parallel to the first rotational axis.

The human-powered vehicle drive unit according to the tenth aspect is easily reduced in size in a direction parallel to the first rotational axis.

In accordance with an eleventh aspect of the present disclosure, the human-powered vehicle drive unit according to any one of the fifth to ninth aspects is configured so that the one-way clutch includes at least one of a roller one-way clutch, a ratchet one-way clutch, and a sprag one-way clutch.

With the human-powered vehicle drive unit according to the eleventh aspect, at least one of the roller one-way clutch, the ratchet one-way clutch, and the sprag one-way clutch appropriately restricts transmission of human driving force toward the electric motor.

In accordance with a twelfth aspect of the present disclosure, in the human-powered vehicle drive unit according to any one of the first to eleventh aspects, the speed reducer is configured to reduce a rotational speed of the electric motor using only a gear.

With the human-powered vehicle drive unit according to the twelfth aspect, the gear simplifies the structure of the speed reducer.

In accordance with a thirteenth aspect of the present disclosure, the human-powered vehicle drive unit according to any one of the first to twelfth aspects further comprises a circuit board on which at least a portion of an electronic controller is provided. The electronic controller is configured to control the electric motor.

With the human-powered vehicle drive unit according to the thirteenth aspect, the circuit board is provided on the human-powered vehicle drive unit.

In accordance with a fourteenth aspect of the present disclosure, the human-powered vehicle drive unit according to the thirteenth aspect is configured so that the circuit board extends in a direction intersecting with an axial direction of the crankshaft.

With the human-powered vehicle drive unit according to the fourteenth aspect, the circuit board is appropriately arranged on the drive unit.

In accordance with a fifteenth aspect of the present disclosure, the human-powered vehicle drive unit according to the fourteenth aspect is configured so that the circuit board overlaps with the speed reducer in a direction intersecting with the axial direction of the crankshaft.

With the human-powered vehicle drive unit according to the fifteenth aspect, the circuit board is appropriately arranged on the drive unit.

In accordance with a sixteenth aspect of the present disclosure, the human-powered vehicle drive unit according to any one of the thirteenth to fifteenth aspects is configured so that the circuit board includes a recess, and a portion of an output shaft of the electric motor is arranged in the recess.

With the human-powered vehicle drive unit according to the sixteenth aspect, the circuit board is located around the output shaft of the electric motor.

In accordance with a seventeenth aspect of the present disclosure, the human-powered vehicle drive unit according to any one of the first to sixteenth aspects further comprises a housing configured to accommodate at least a portion of the crankshaft such that a shortest distance between a rotational axis of the crankshaft and an outer surface of the housing is less than or equal to 70 mm on a plane that includes the rotational axis of the crankshaft and a rotational axis of the electric motor as viewed in an axial direction of the crankshaft.

With the human-powered vehicle drive unit according to the seventeenth aspect, the distance from the crankshaft to the axis of the drive wheel is limited.

In accordance with an eighteenth aspect of the present disclosure, the human-powered vehicle drive unit according to any one of the first to seventeenth aspects further comprises a human driving force detector provided on a transmission path of human driving force between the crankshaft and a part of the output portion that is coupled to the clutch.

With the human-powered vehicle drive unit according to the eighteenth aspect, human driving force can be appropriately detected by a human driving force sensor such as a torque sensor.

The human-powered vehicle drive unit of the present disclosure reduces loss of human driving force.

BRIEF DESCRIPTION OF THE DRAWINGS

Referring now to the attached drawings which form a part of this original disclosure.

DETAILED DESCRIPTION OF EMBODIMENTS DISCLOSURE

Figure 1:
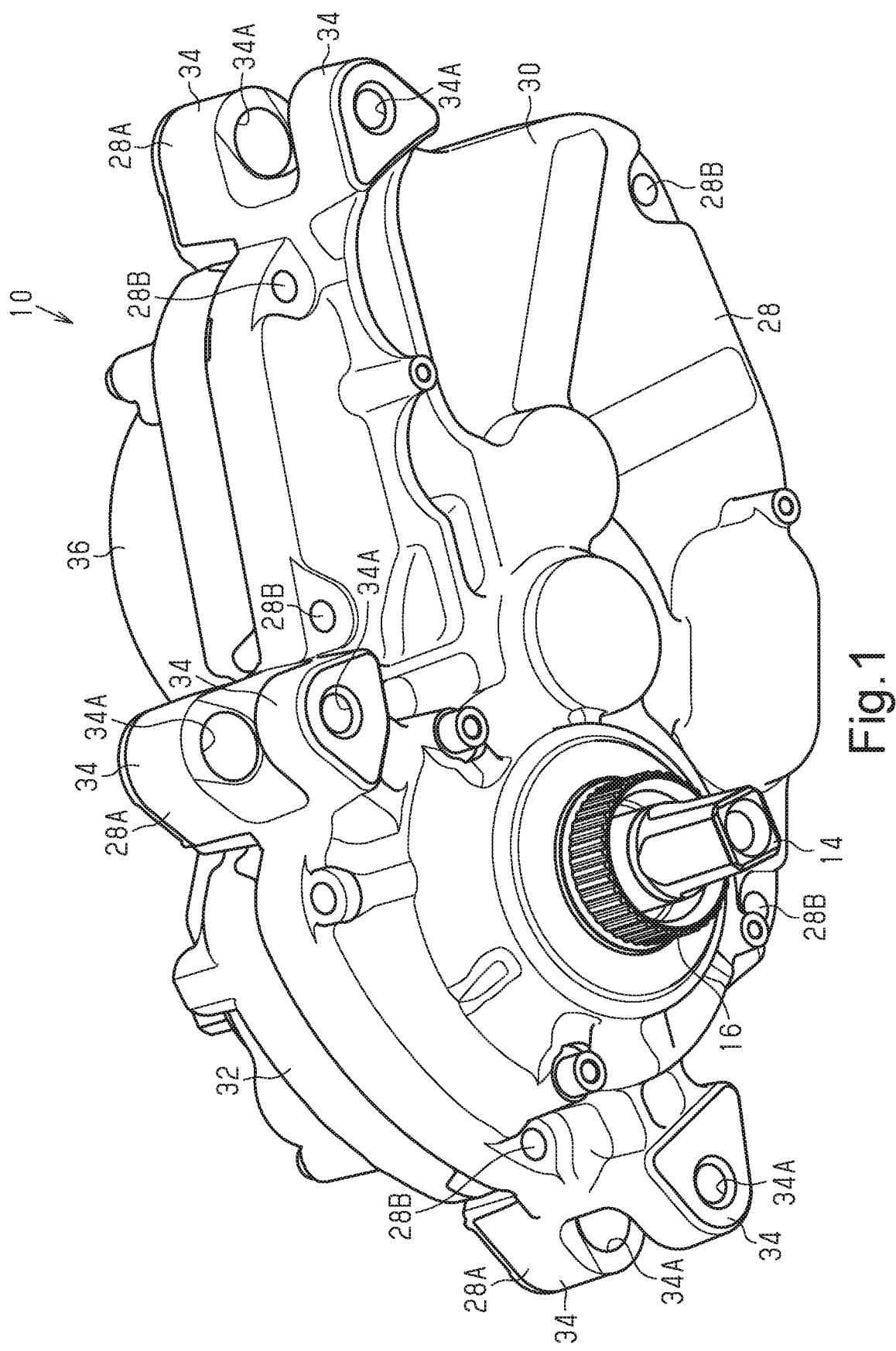
FIG. 1 is a perspective view of one embodiment of a human-powered vehicle drive unit.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

One embodiment of a human-powered vehicle drive unit 10 will now be described with reference to FIGS. 1 to 9. In the description hereafter, the human-powered vehicle drive unit 10 is simply referred to as the drive unit 10. The drive unit 10 is provided on a human-powered vehicle. The human-powered vehicle is a vehicle that can be driven by at least human driving force. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike and an electric assist bicycle (E-bike). In the embodiments described below, the human-powered vehicle refers to a bicycle.

The drive unit 10 includes an electric motor 12, a crankshaft 14, an output portion 16, a speed reducer 18, and a clutch 20. The electric motor 12 is configured to assist in propulsion of the human-powered vehicle, a crankshaft 14. The speed reducer 18 is configured to reduce the rotational speed of the electric motor 12 in multiple steps. The output portion 16 is coupled to the crankshaft 14. The output portion 16 is configured to rotate in a first rotational direction in a case in which the crankshaft 14 rotates in the first rotational direction. The output portion 16 is configured to rotate in a second rotational direction in a case in which the crankshaft 14 rotates in the second rotational direction. The clutch 20 is provided between the output portion 16 and the speed reducer 18. The clutch 20 is configured to transmit the rotational force of the electric motor 12 via the speed reducer 18 to the output portion 16. The first rotational direction is a rotational direction of the crankshaft 14 that moves the human-powered vehicle forward.

Preferably, the speed reducer 18 includes a first gear 24 provided on an output shaft 22 of the electric motor 12 and a second gear 26 engaged with the first gear 24. Preferably, the first gear 24 has a smaller diameter than the second gear 26, and the first gear 24 has fewer teeth than the second gear 26.

Preferably, the drive unit 10 further includes a housing 28 configured to accommodate at least a portion of the crankshaft 14. The housing 28 includes a first housing part 30 and a second housing part 32. One of the first housing part 30 and the second housing part 32 includes a first side surface of the drive unit 10 in an axial direction A1 of the crankshaft 14. The other one of the first housing part 30 and the second housing part 32 includes a second side surface of the drive unit 10 in the axial direction A1 of the crankshaft 14. The housing 28 includes a coupling portion 34 that couples the drive unit 10 to a frame of the human-powered vehicle. Preferably, the coupling portion 34 is provided on the first housing part 30. Preferably, a plurality of coupling portions 34 is provided. The coupling portions 34 are provided on projections 28A projecting from a peripheral portion of the housing 28 around the crankshaft 14. Each coupling portion 34 includes a hole 34A, into which a bolt is inserted to couple the drive unit 10 to the frame.

Figure 4:
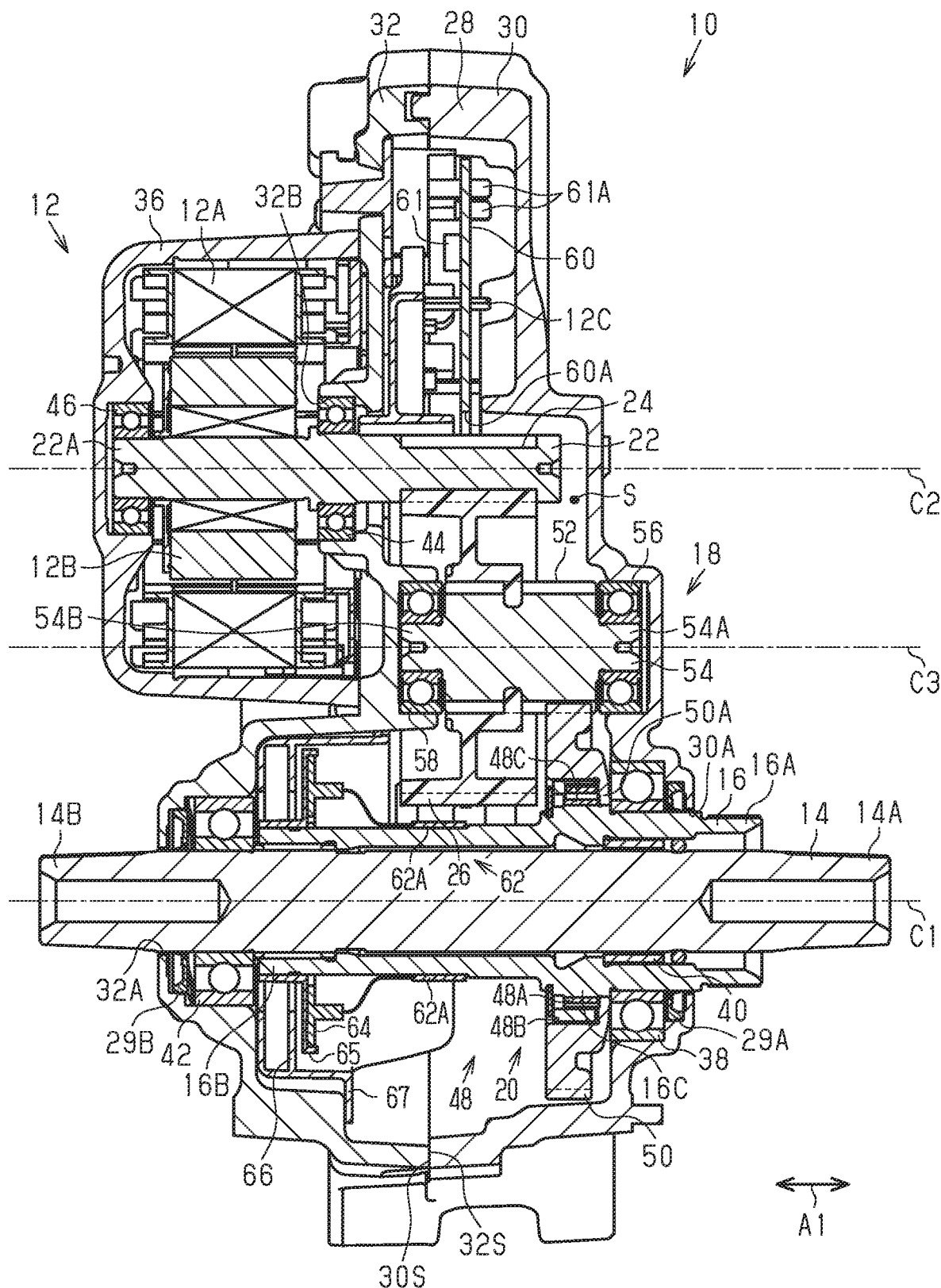
FIG. 4 is a cross-sectional view of the human-powered vehicle drive unit taken along line D4-D4 in FIG. 2.
Figure 5:
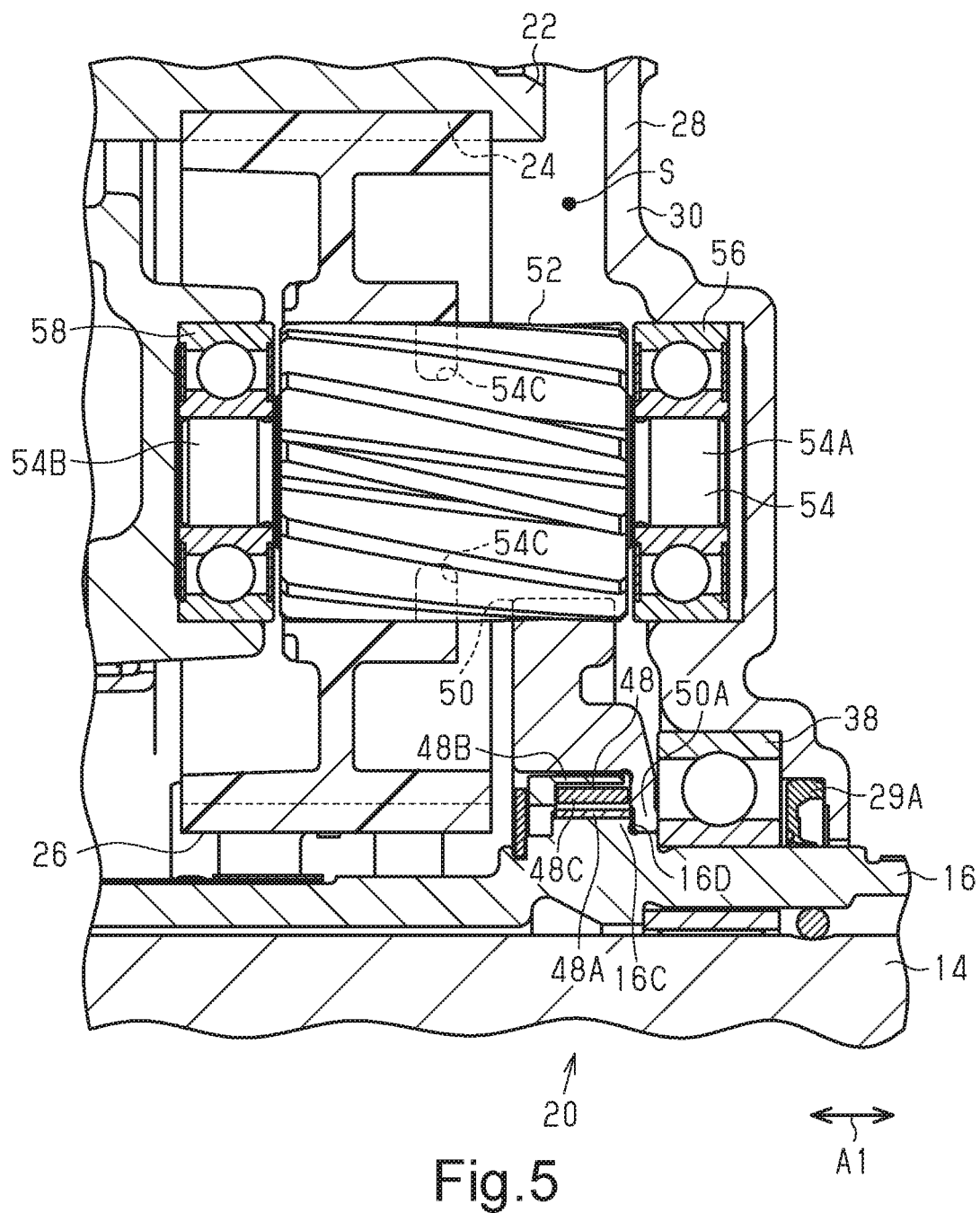
FIG. 5 is a partially enlarged cross-sectional view of the human-powered vehicle drive unit shown in FIG. 4.

As shown in FIG. 4, in a state in which a first coupling surface 30S of the first housing part 30 overlaps with a second coupling surface 32S of the second housing part 32, the first housing part 30 and the second housing part 32 are coupled to each other by bolts 28B. A hollow space S is formed by the first housing part 30 and the second housing part 32 and accommodates a portion of the electric motor 12, a portion of the crankshaft 14, a portion of the output portion 16, the speed reducer 18, and the clutch 20. The portion of the electric motor 12 located in the hollow space S includes a portion of the output shaft 22 of the electric motor 12. The portion of the crankshaft 14 located in the hollow space S includes an intermediate portion excluding a first end 14A and a second end 14B of the crankshaft 14 in the axial direction A1. The portion of the output portion 16 located in the hollow space S includes a portion excluding a first end 16A of the output portion 16 in the axial direction A1 of the crankshaft 14.

The housing 28 further includes a motor housing 36 that accommodates the electric motor 12. The motor housing 36 mounts on an outer surface of the second housing part 32. The motor housing 36 can be formed integrally with the second housing part 32. The housing 28 can be formed from metal, resin, or both metal and resin. In a case in which the housing 28 is formed from both metal and resin, for example, the first housing part 30 and the second housing part 32 can be formed from metal, and the motor housing 36 can be formed from resin.

Figure 2:
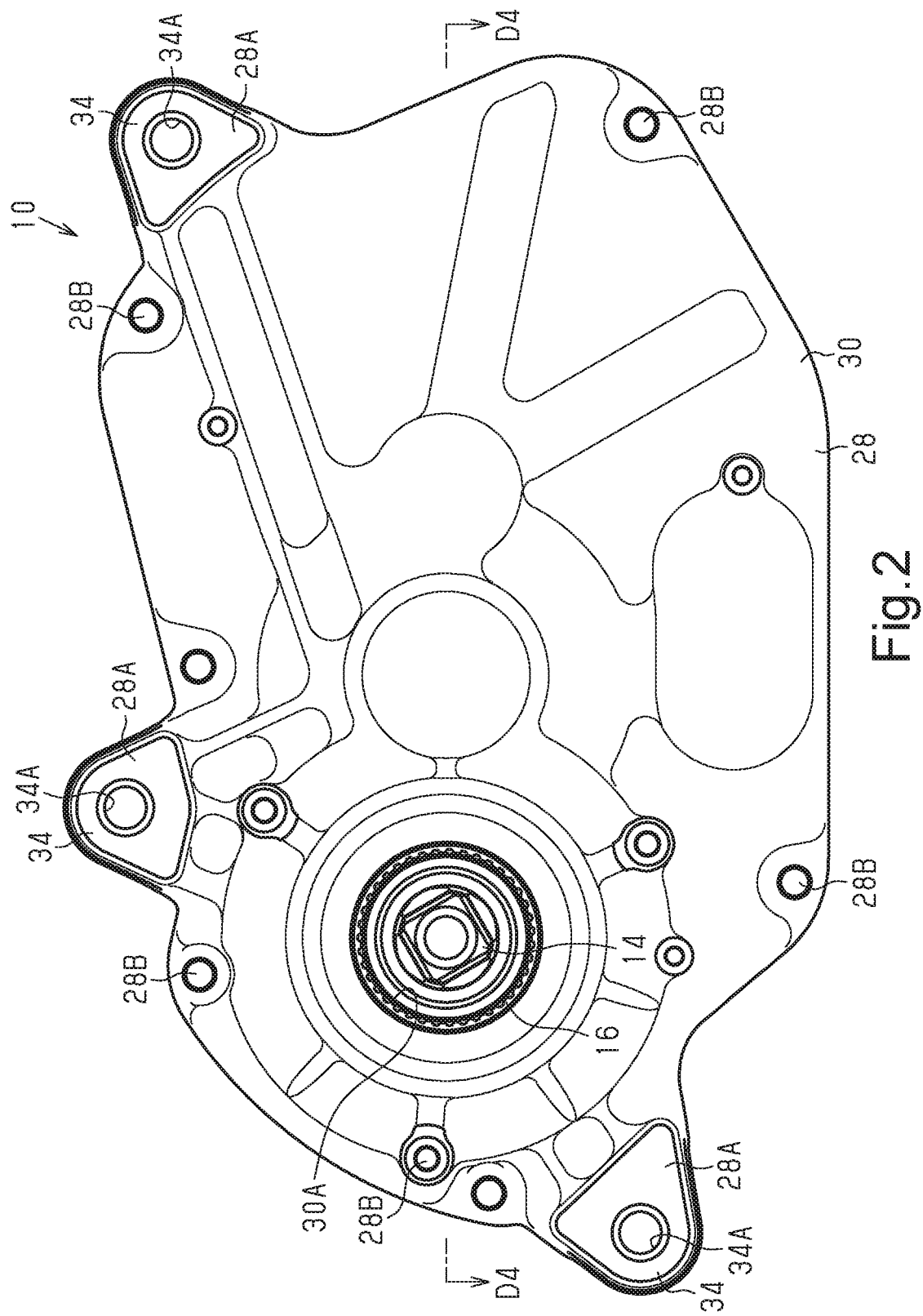
FIG. 2 is a right side elevational view of the human-powered vehicle drive unit shown in FIG. 1.

As shown in FIGS. 2 and 4, the first housing part 30 includes a first hole 30A, from which the first end 14A of the crankshaft 14 and the first end 16A of the output portion 16 project. A first seal member 29A is provided in the hollow space S and is in contact with the first housing part 30 and the output portion 16 in the vicinity of the first end 14A.

Figure 3:
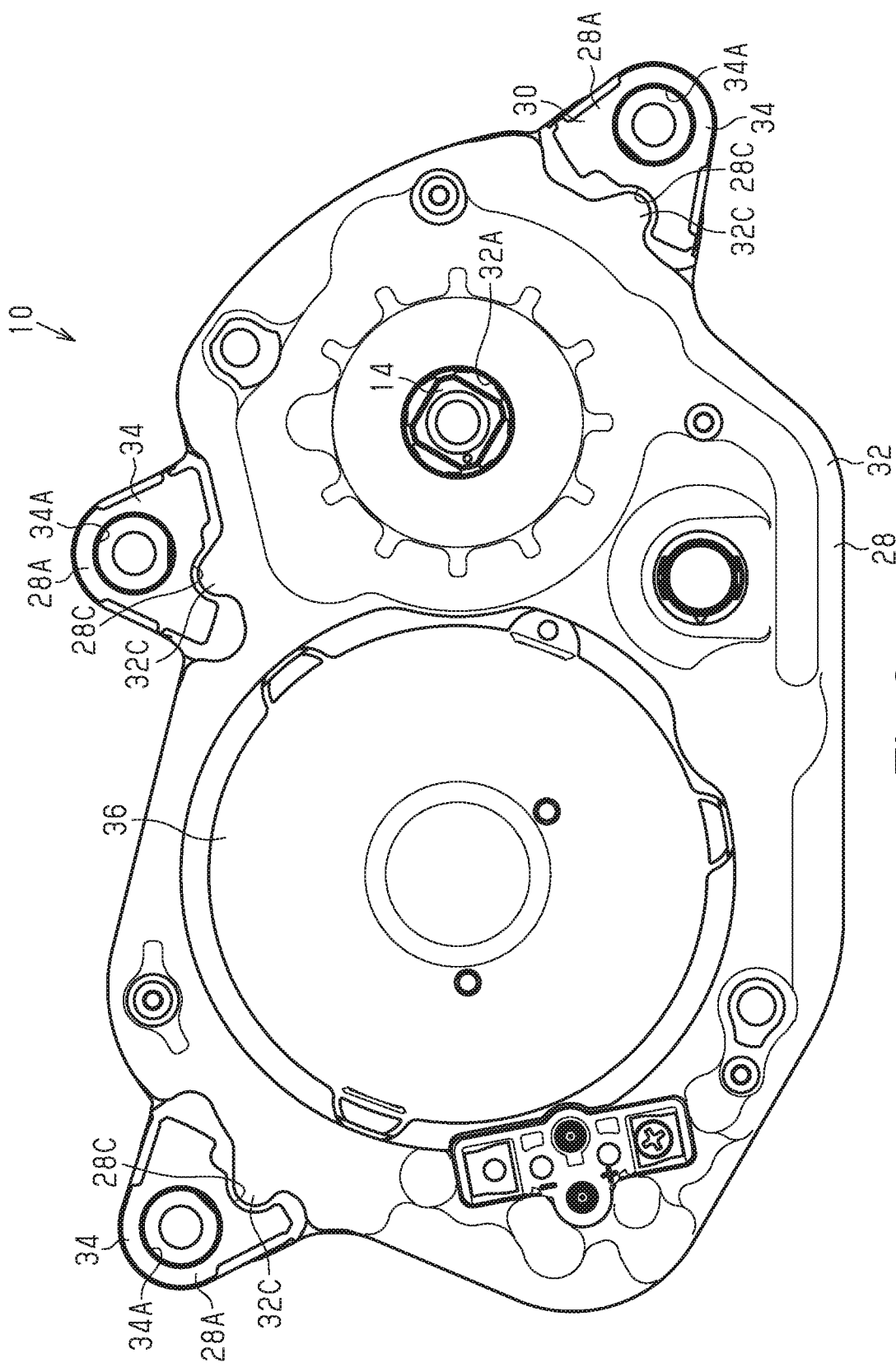
FIG. 3 is a left side elevational view of the human-powered vehicle drive unit shown in FIG. 1.

As shown in FIGS. 3 and 4, the second housing part 32 includes a second hole 32A, from which the second end 14B of the crankshaft 14 projects. A second seal member 29B is provided in the hollow space S and is in contact with the second housing part 32 and the crankshaft 14 in the vicinity of the second hole 32A. The second housing part 32 includes a third hole 32B, into which the output shaft 22 of the electric motor 12 is inserted. The first seal member 29A and the second seal member 29B are formed from an elastic resin material. The elastic resin material includes, for example, a synthetic rubber.

As shown in FIG. 4, the output portion 16 is a hollow shaft and is arranged around the crankshaft 14 so that a first rotational axis C1 of the crankshaft 14 conforms to a rotational axis of the output portion 16. Preferably, the output portion 16 is provided on the crankshaft 14 to rotate integrally with the crankshaft 14. The output portion 16 is, for example, spline-fitted to the crankshaft 14. Preferably, the output portion 16 is coupled to the crankshaft 14 so as not to rotate relative to the crankshaft 14 about the first rotational axis C1. The output portion 16 can be coupled to the crankshaft 14 to be rotatable relative to the crankshaft 14 at a predetermined angle. The predetermined angle is, for example, less than ten degrees. The output portion 16 is rotatably supported relative to the housing 28 by a first bearing 38 that is provided in the housing 28 in the vicinity of the first end 14A of the first housing part 30. The first bearing 38 includes, for example, a rolling bearing. In the present embodiment, the output portion 16 has a second end 16B located at a side closer to the second end 14B of the crankshaft 14 than a central portion of the crankshaft 14 in the axial direction A1 of the crankshaft 14. The inner circumferential portion of the second end 16B of the output portion 16 includes a spline and is coupled to the outer circumferential portion of the crankshaft 14.

The first end 14A of the crankshaft 14 is supported by the output portion 16 via a second bearing 40 provided on the inner circumferential portion of the output portion 16. The second bearing 40 includes, for example, a slide bearing. The second end 14B of the crankshaft 14 is rotatably supported relative to the housing 28 by a third bearing 42 that is provided in the housing 28 in the vicinity of the second hole 32A of the second housing part 32. The third bearing 42 includes, for example, a rolling bearing.

Preferably, the electric motor 12 is a motor of an inner rotor type. The electric motor 12 includes a stator 12A and a rotor 12B. In the present embodiment, the output shaft 22 is fixed to the rotor 12B. The stator 12A and the rotor 12B are accommodated in the motor housing 36. The stator 12A is fixed to an inner surface of the motor housing 36. The output shaft 22 has an intermediate portion rotatably supported relative to the housing 2 by a fourth bearing 44 provided on an inner circumferential portion of the second housing part 32 that defines the third hole 32B. The fourth bearing 44 includes, for example, a rolling bearing. The output shaft 22 has a first end 22A supported by a fifth bearing 46 provided on the motor housing 36 to be rotatable relative to the housing 28. The fifth bearing 46 includes, for example, a rolling bearing.

Preferably, the clutch 20 includes a second one-way clutch 48. Preferably, the second one-way clutch 48 includes at least one of a one-way roller clutch, a one-way ratchet clutch, and a one-way sprag clutch. The second one-way clutch 48 includes, for example, an inner race 48A, an outer race 48B, and a transmission body 48C provided between the inner race 48A and the outer race 48B. The transmission body 48C includes, for example, a roller, a pawl and a sprag. The second one-way clutch 48 is provided on the outer circumferential portion of the output portion 16 about the first rotational axis C1. The inner race 48A of the second one-way clutch 48 is provided on the outer circumferential portion of the output portion 16. The inner race 48A of the second one-way clutch 48 can be formed integrally with the output portion 16. The inner race 48A of the second one-way clutch 48 has a larger outer diameter than the output portion 16.

Preferably, the speed reducer 18 further includes a third gear 50 provided on the outer circumferential portion of the second one-way clutch 48 and a fourth gear 52 engaged with the third gear 50. Preferably, the third gear 50 has a larger diameter than the fourth gear 52, and the third gear 50 has fewer teeth than the fourth gear 52. The outer race 48B of the second one-way clutch 48 is provided on an inner circumferential portion of the third gear 50. The outer race 48B of the second one-way clutch 48 can be formed integrally with the third gear 50. Preferably, the speed reducer 18 is configured to reduce the rotational speed of the electric motor 12 using only gears. In the present embodiment, the speed reducer 18 reduces the rotational speed of the electric motor 12 in two steps but can be configured to reduce the rotational speed in three or more steps. Preferably, the first gear 24 and the second gear 26 include helical gears. The first gear 24 can be formed integrally with the output shaft 22 of the electric motor 12 or can be formed separately from the output shaft 22 of the electric motor 12 and coupled to the output shaft 22. The first gear 24 and the second gear 26 can include spur gears. Preferably, the third gear 50 and the fourth gear 52 include helical gears. The third gear 50 and the fourth gear 52 can include spur gears.

The speed reducer 18 further includes a rotary body 54 on which the second gear 26 and the fourth gear 52 are provided. The second gear 26 and the fourth gear 52 are configured to integrally rotate. Preferably, the second gear 26 has a larger diameter than the fourth gear 52, and the second gear 26 has more teeth than the fourth gear 52. Preferably, the rotary body 54 is formed from a metal material. The rotary body 54 has a first end 54A rotatably supported relative to the housing 28 by a sixth bearing 56 that is provided on an inner surface of the first housing part 30. The sixth bearing 56 includes, for example, a rolling bearing. The sixth bearing 56 is arranged at a position at least partially overlapping with the first bearing 38 in the axial direction A1 of the crankshaft 14. The rotary body 54 has a second end 54B rotatably supported relative to the housing 28 by a seventh bearing 58 that is provided on an inner surface of the second housing part 32. The seventh bearing 58 includes, for example, a rolling bearing. The second gear 26 is configured to have an outer diameter portion and an inner diameter portion having a smaller width than the outer diameter portion in the axial direction A1 of the crankshaft 14. Preferably, the seventh bearing 58 is arranged between width-wise opposite ends of the second gear 26 in the axial direction A1 of the crankshaft 14. The substantially entire seventh bearing 58 is located in a space formed between the outer diameter portion of the second gear 26 and the outer circumferential portion of the second end 54B of the rotary body 54. Thus, even in a case in which the outer diameter portion of the second gear 26 is increased in width in the axial direction A1 of the crankshaft 14, extension of the rotary body 54 toward the second housing part 32 in the axial direction A1 of the crankshaft 14 will be limited. This allows for reduction in the width of the drive unit 10 in the axial direction A1 of the crankshaft 14. Preferably, the diameter of the first end 54A and the second end 54B is substantially the same as the diameter of the fourth gear 52. Preferably, the outer diameter of the outer races of the sixth bearing 56 and the seventh bearing 58 is substantially the same as the diameter of the second gear 26. The rotary body 54 has a third rotational axis C3. The second gear 26 is located at a position closer to the electric motor 12 than the fourth gear 52 in the axial direction A1 of the crankshaft 14. The inner diameter portion of the third gear 50 has an end 50A in the axial direction A1 of the crankshaft 14. The end 50A is located between the inner race 48A of the second one-way clutch 48 and the inner race of the first bearing 38 in the axial direction A1 of the crankshaft 14. In the present embodiment, the end 50A of the inner diameter portion of the third gear 50 in the axial direction A1 of the crankshaft 14 is located between a step 16D (refer to FIG. 5) of the outer circumferential portion of the output portion 16 and the inner race of the first bearing 38. This positions the third gear 50 in the axial direction A1 of the crankshaft 14.

Preferably, the fourth gear 52 is formed integrally with the outer circumferential portion of the rotary body 54 about the third rotational axis C3. Preferably, the fourth gear 52 is formed from a metal material. Preferably, the fourth gear 52 is formed integrally with the outer circumferential portion of the rotary body 54 about the third rotational axis C3. The fourth gear 52 and the second gear 26 are located adjacent to each other in a direction in which the third rotational axis C3 of the rotary body 54 extends. Preferably, the second gear 26 includes a resin material. Ridges and valleys forming the fourth gear 52 extend in the direction of the third rotational axis C3 and are formed where the second gear 26 is provided. The ridges and valleys forming the fourth gear 52 function as the fourth gear 52 at a portion located closer to the first end 54A than where the second gear 26 is provided. The inner circumferential portion of the second gear 26 is provided on the ridges and valleys forming the fourth gear 52 to restrict rotation of the second gear 26 relative to the rotary body 54. The outer circumferential portion of the rotary body 54 about the third rotational axis C3 includes a recess 54C recessed in the radial direction. The recess 54C can be annular. The recess 54C can be intermittently provided about the third rotational axis C3. Only one recess 54C can be provided. The inner circumferential portion of the second gear 26 is provided on the recess 54C to restrict movement of the second gear 26 relative to the rotary body 54 in a direction in which the third rotational axis C3 extends. Preferably, the first end 54A and the second end 54B of the rotary body 54 are configured to have a smaller outer diameter than the fourth gear 52. In the present embodiment, the rotary body 54 and the fourth gear 52 are integrally formed from a metal material, and the second gear 26 is formed from a resin material. Preferably, the second gear 26 is provided on the outer circumferential portion of the rotary body 54 through insert molding. More specifically, for example, machining and rolling are performed to form the rotary body 54 from a metal integrally with the recess 54C and ridges and valleys that form the fourth gear 52, and insert molding is performed on the rotary body 54 so that the resin enters the recess 54C and the ridges and valleys forming the fourth gear 52. As a result, the second gear 26 is provided on the outer circumferential portion of the rotary body 54. Preferably, the recess 54C is formed in a central portion of the rotary body 54 in the axial direction A1 of the crankshaft 14.

Figure 6:
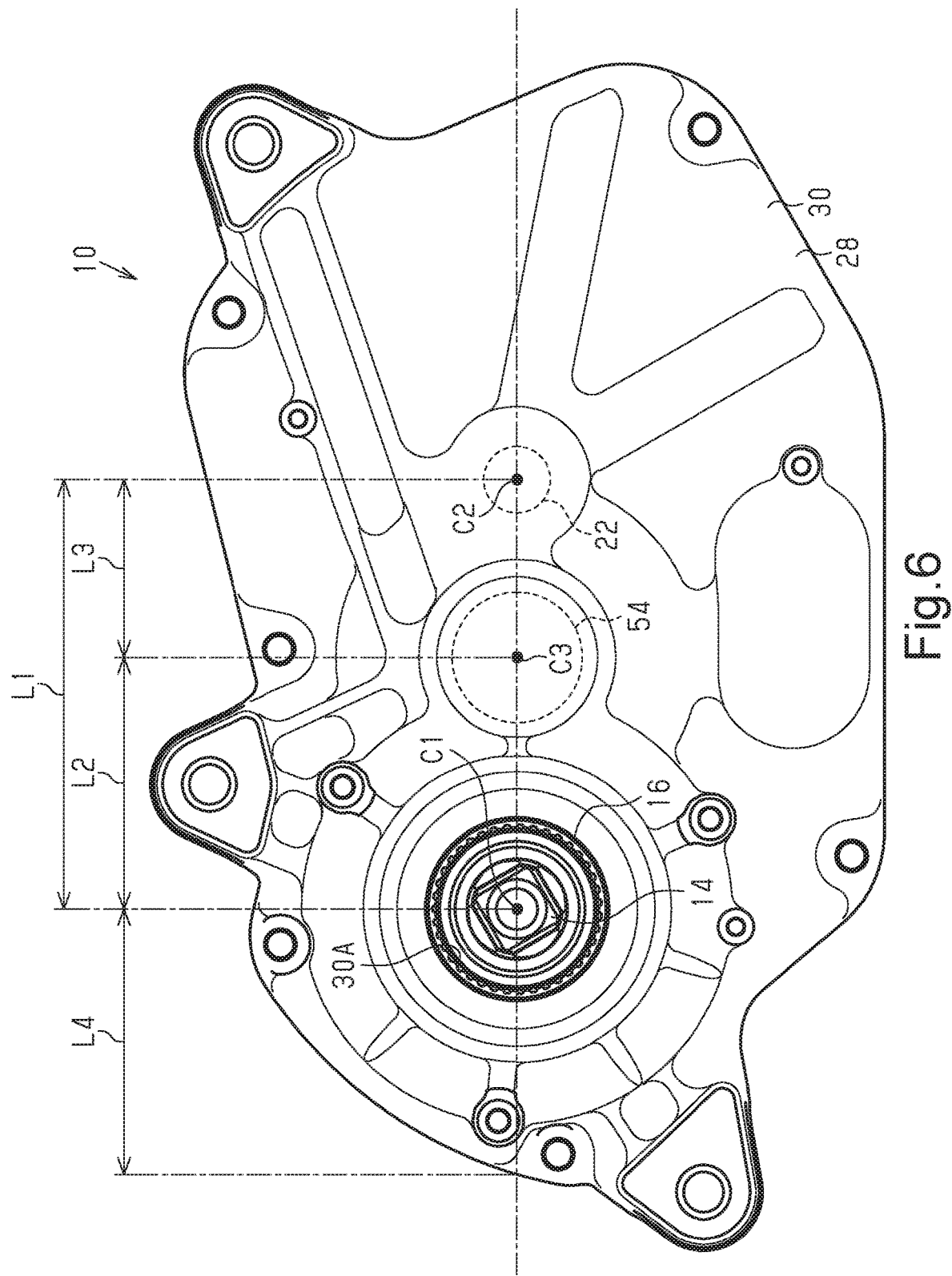
FIG. 6 is a right side elevational view of the human-powered vehicle drive unit shown in FIG. 2 showing positions of a first rotational axis, a second rotational axis, and a third rotational axis.

The positional relationship of the electric motor 12, the crankshaft 14, the output portion 16, and the speed reducer 18 will now be described with reference to FIGS. 4 and 6. The output portion 16 and the third gear 50 are configured to rotate about the first rotational axis C1. The output shaft 22 of the electric motor 12 and the first gear 24 are configured to rotate about a second rotational axis C2 that is parallel to the first rotational axis C1. The second gear 26 and the fourth gear 52 are configured to rotate about the third rotational axis C3 that is parallel to the first rotational axis C1 and the second rotational axis C2. The first rotational axis C1, the second rotational axis C2, and the third rotational axis C3 are coplanar with each other.

Preferably, the shortest distance L1 between the first rotational axis C1 and the second rotational axis C2 is greater than the shortest distance L2 between the first rotational axis C1 and the third rotational axis C3. Preferably, the shortest distance L3 between the second rotational axis C2 and the third rotational axis C3 is less than the shortest distance L2 between the first rotational axis C1 and the third rotational axis C3. The shortest distance L1 between the first rotational axis C1 and the second rotational axis C2 can be equal to the shortest distance L2 between the first rotational axis C1 and the third rotational axis C3. The shortest distance L3 between the second rotational axis C2 and the third rotational axis C3 can be equal to the shortest distance L2 between the first rotational axis C1 and the third rotational axis C3.

Preferably, as viewed in the axial direction A1 of the crankshaft 14, the shortest distance L4 from a rotational axis C1 of the crankshaft 14 to an outer surface of the housing 28 is less than or equal to 70 mm on a plane including the rotational axis C1 of the crankshaft 14 and a rotational axis C2 of the electric motor 12. Preferably, in a case in which the human-powered vehicle includes a front wheel and a rear wheel and the rear wheel is the drive wheel, the drive unit 10 is coupled to the frame of the human-powered vehicle in a state in which the crankshaft 14 is arranged on the human-powered vehicle at a rear side of the output shaft 22 of the electric motor 12.

Preferably, as viewed in a direction parallel to the first rotational axis C1, the third gear 50 is offset from the electric motor 12. As viewed in a direction parallel to the first rotational axis C1, the third gear 50 is arranged so as not to overlap with the stator 12A of the electric motor 12. In this case, the gears of the speed reducer 18 are allowed to be enlarged. This increases the degree of freedom for designing the reduction ratio of the speed reducer 18. As viewed in a direction parallel to the first rotational axis C1, the third gear 50 can be arranged to overlap with the stator 12A of the electric motor 12. In this case, the drive unit 10 is allowed to be reduced in size in a direction extending along a plane that includes the first rotational axis C1 and the third rotational axis C3.

Figure 7:
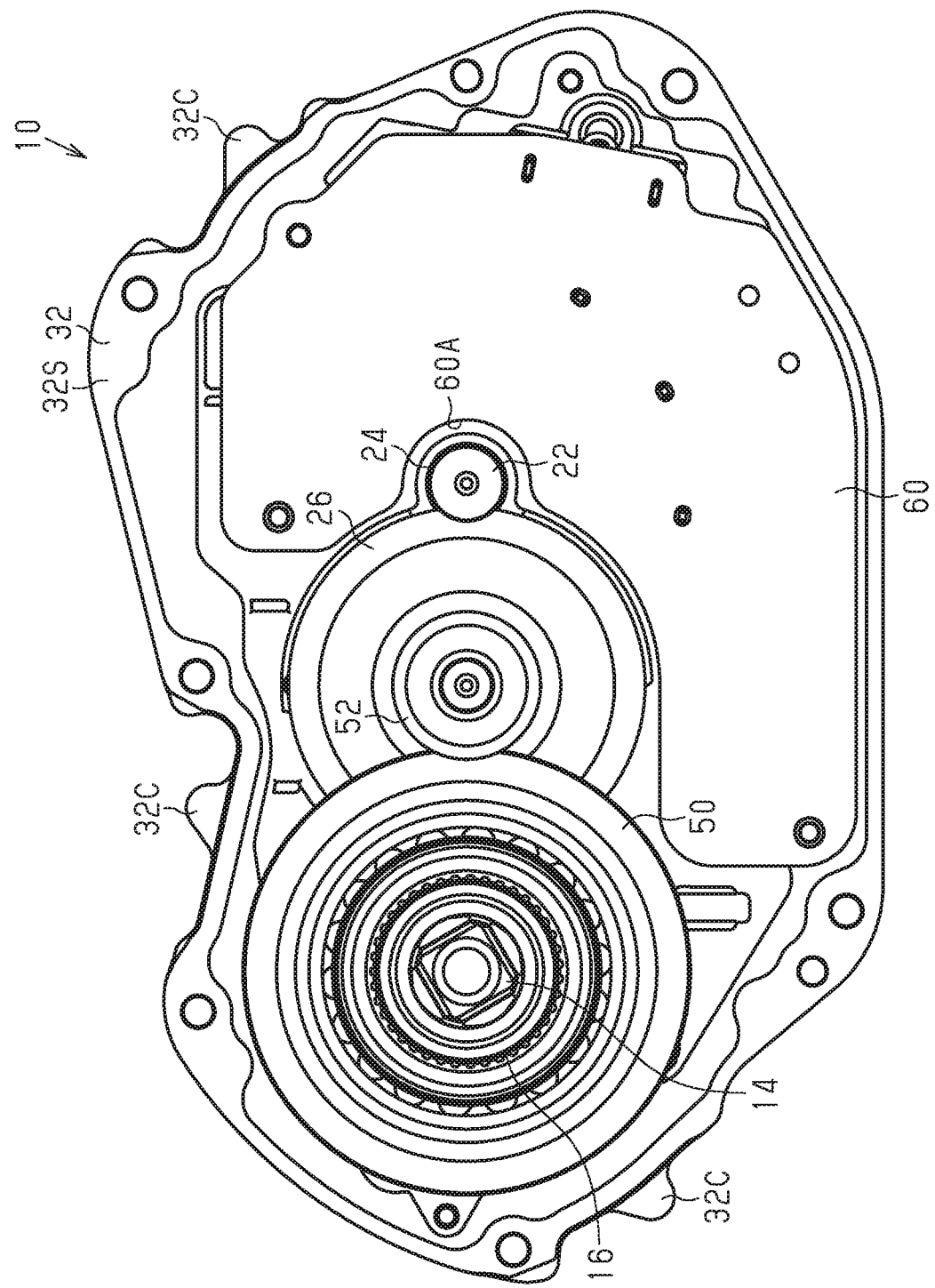
FIG. 7 is a right side elevational view of the human-powered vehicle drive unit shown in FIG. 2 with a first housing removed.

As shown in FIGS. 4 and 7, preferably, the drive unit 10 further includes a circuit board 60 on which at least a portion of an electronic controller 61 that controls the electric motor 12 is provided. The electronic controller 61 includes an arithmetic processing unit that runs predetermined control programs. The arithmetic processing unit includes, for example, a central processing unit (CPU) or a micro processing unit (MPU). The electronic controller 61 can include one or more microcomputers. The electronic controller 61 is formed of one or more semiconductor chips that are mounted on the circuit board 60. The term "electronic controller" as used herein refers to hardware that executes a software program. Preferably, a storage unit is further provided on the circuit board 60. The storage unit stores information used in various control programs and various control processes. The storage unit includes, for example, a nonvolatile memory and a volatile memory. Several electronic component 61A are mounted on the circuit board 60. The electronic components 61 can be mounted on each of opposite surfaces of the circuit board 60 in the thickness-wise direction. The electronic components 61A includes, for example, a microprocessor, a capacitor, and a resistor.

Preferably, the circuit board 60 extends in a direction intersecting with the axial direction A1 of the crankshaft 14. As viewed in a direction intersecting with the axial direction A1 of the crankshaft 14, the circuit board 60 is arranged to overlap with the electric motor 12. The circuit board 60 is accommodated in the hollow space S formed by the first housing part 30 and the second housing part 32. Preferably, the circuit board 60 is arranged to overlap with the speed reducer 18 in a direction intersecting with the axial direction of the crankshaft 14. For example, the circuit board 60 is arranged to overlap with the first gear 24 and the second gear 26 in a direction intersecting with the axial direction A1 of the crankshaft 14. The direction intersecting with the axial direction A1 of the crankshaft 14 includes a direction orthogonal to the crankshaft 14. Preferably, the circuit board 60 includes a recess 60A, and a portion of the output shaft 22 of the electric motor 12 is located in the recess 60A. The recess 60A is formed in a peripheral portion of the circuit board 60. The circuit board 60 has an edge located in the proximity of the outer circumferential portions of the first gear 24 and the second gear 26 so that the edge extends along a portion of the outer circumferences of the first gear 24 and the second gear 26. The electric motor 12 has an electric terminal 12C extending through a through hole of the second housing part 32 and directly connected to the circuit board 60.

Preferably, the drive unit 10 includes a human driving force detector 62 configured to detect human driving force. Preferably, the human driving force detector 62 is provided on a transmission path of human driving force between the crankshaft 14 and a part 16C of the output portion 16 that is coupled to the clutch 20. The human driving force detector 62 includes a torque sensor. The torque sensor is used to detect torque of human driving force. The torque sensor includes, for example, a strain sensor 62A. The strain sensor 62A includes, for example, a strain gauge and a semiconductor strain sensor. The strain sensor 62A is provided on an outer circumferential surface of the output portion 16. A plurality of strain sensors 62A can be provided. For example, in a case in which two strain sensors 62A are provided, the strain sensors 62A are located at positions separated by 180° about the first rotational axis C1. The detector 62 is connected to a first circuit board 64 via a flexible printed wiring board. A first signal processing circuit that processes a signal output from the detector 62 and a first antenna connected to the first signal processing circuit are provided on the first circuit board 64. The first circuit board 64 is coupled to the output portion 16 via a board holder 65. A second circuit board 66 is provided in the hollow space S of the housing 28 to be faced to the first circuit board 64 in the first rotational axis C1 and spaced apart from the first circuit board 64. The second circuit board 66 mounts on the housing 28 via, for example, a board holder 67. However, the second circuit board 66 can directly mount on the housing 28. A second antenna is provided on the second circuit board 66 and faced to the first antenna. A second signal processing circuit that processes a signal received by the second antenna and a power supply circuit that supplies electric power to the first antenna are provided on the second circuit board 66. The second circuit board 66 is electrically connected to the circuit board 60 via an electric cable. The human driving force detector 62 transmits an output to the second antenna via the first antenna through wireless communication. Preferably, the controller controls the electric motor 12 in accordance with the output of the human driving force detector 62. For example, the controller drives the electric motor so that the ratio of human driving force to propulsion force of the electric motor 12 is set to a predetermined ratio in accordance with a signal corresponding to the human driving force detected by the human driving force detector 62. The torque sensor can include a magnetostriction sensor instead of the strain sensor 62A. In this case, a magnetostriction element can be provided on the transmission path of human driving force, and the magnetostriction sensor can be provided around the magnetostriction element. This allows omission of the first circuit board 64 and the second circuit board 66.

Figure 8:
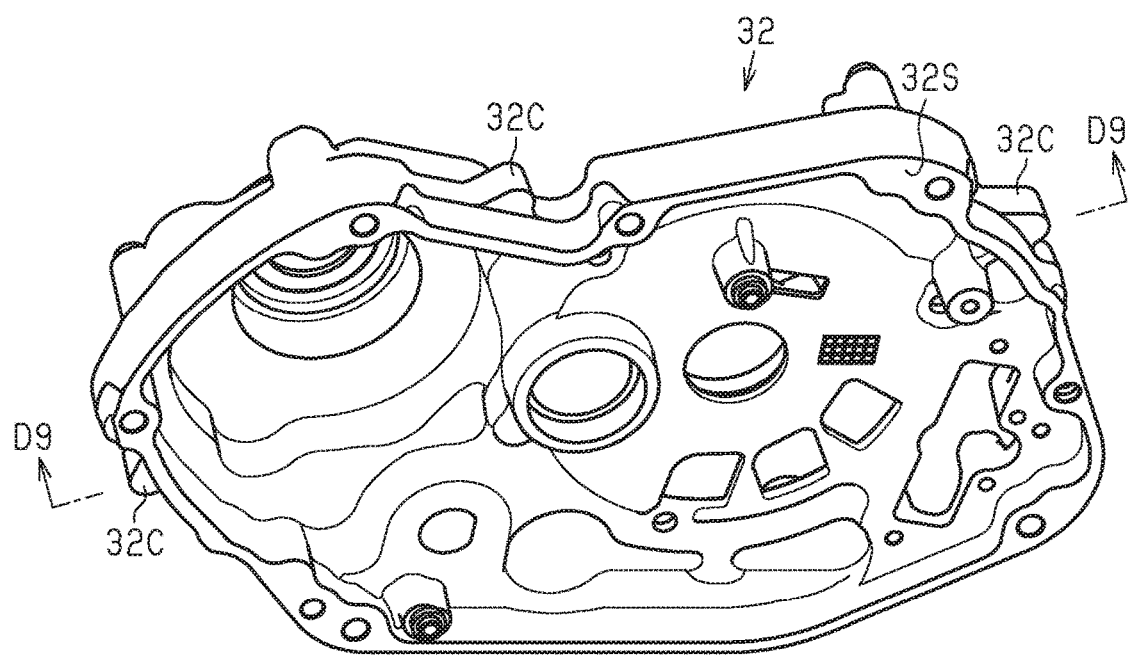
FIG. 8 is a perspective view of a second housing shown in FIG. 1.
Figure 9:
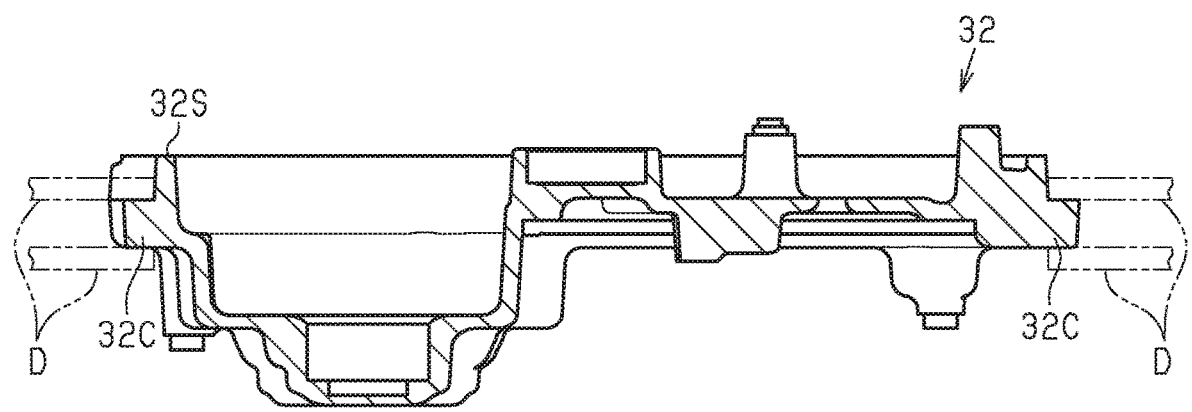
FIG. 9 is a cross-sectional view of the second housing taken along line D9-D9 in FIG. 8.

A method for manufacturing the second housing part 32 will now be described with reference to FIGS. 3, 8, and 9. The method for manufacturing the second housing part 32 includes a first step and a second step.

The first step includes a step of manufacturing the second housing part 32. In the first step, projections 32C are formed on the peripheral portion of the second housing part 32 to project toward an outer circumference. Preferably, two or more projections 32C are formed. The projections 32C are provided at positions separated from the second coupling surface 32S of the second housing part 32. The projections 32C are provided at positions facing the projections 28A in the axial direction A1 of the crankshaft 14. The projections 28A project toward a side closer to the second housing part 32 than the first coupling surface 30S. The projections 28A shown in FIG. 3 include recesses 28C, to which the projections 32C are fitted. The fitting of the projections 32C to the recesses 28C in a state in which the first housing part 30 is coupled to the second housing part 32 reduces effects of the projections 32C on the outer appearance of the housing 28.

The second step includes a step of machining the second coupling surface 32S of the second housing part 32. In the second step, in a state in which the projections 32C of the second housing part 32 are clamped by a jig D, the second coupling surface 32S is machined to be flattened. The jig D is located at a side closer to the projections 32C than the second coupling surface 32S. This limits interference of the projections 32C and the jig D with the machining of the second coupling surface 32S.

Modified Embodiments

The description related to the embodiment exemplifies, without any intention to limit, applicable forms of a human-powered vehicle drive unit according to the present invention. The human-powered vehicle drive unit according to the present invention can be applicable to, for example, modified embodiments that are described below and combinations of at least two of the modified examples that do not contradict each other. In the following modified embodiments, the same reference characters are given to those elements that are the same as the corresponding elements of the embodiment. Such elements will not be described in detail.

Figure 10:
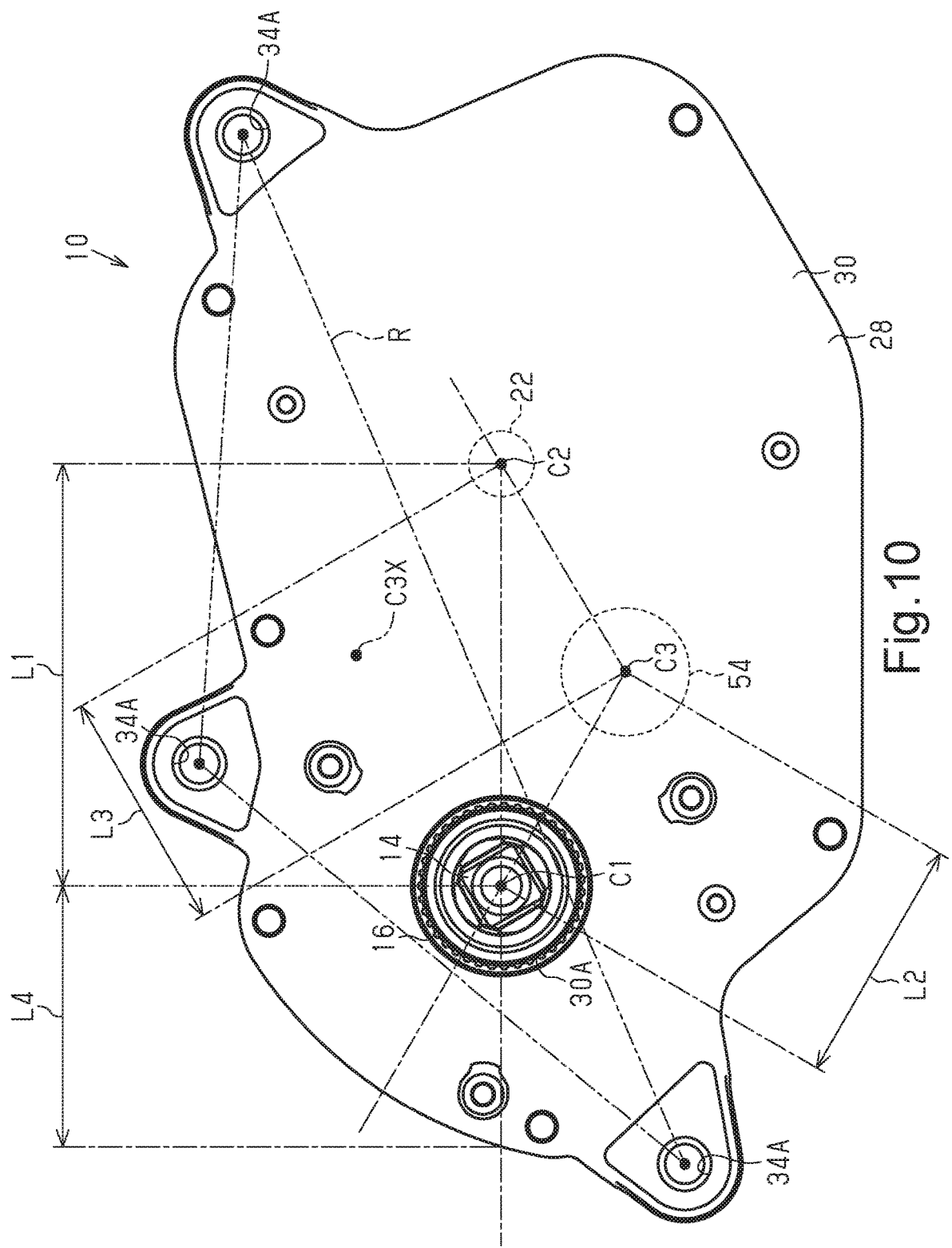
FIG. 10 is a right side view of a first modified example of a human-powered vehicle drive unit showing positions of a first rotational axis, a second rotational axis, and a third rotational axis.

As shown in FIG. 10, the third rotational axis C3 can be spaced apart from a plane that includes the first rotational axis C1 and the second rotational axis C2. Also, in this case, preferably, the shortest distance L1 between the first rotational axis C1 and the second rotational axis C2 is greater than the shortest distance L2 between the first rotational axis C1 and the third rotational axis C3. In a state in which the drive unit 10 is coupled to the frame, the third rotational axis C3 can be provided below the plane including the first rotational axis C1 and the second rotational axis C2 as viewed in the axial direction A1 of the crankshaft 14. Preferably, as viewed in the axial direction A1 of the crankshaft 14, the first rotational axis C1 is arranged in a triangle region R connecting the centers of the holes 34A of the coupling portions 34. As viewed in the axial direction A1 of the crankshaft 14, a third rotational axis C3X can be arranged in the triangle region R connecting the centers of the holes 34A of the coupling portions 34. Preferably, the shortest distance L3 between the second rotational axis C2 and the third rotational axis C3 is less than the distance L2 between the first rotational axis C1 and the third rotational axis C3. In the modified example shown in FIG. 10, the third gear 50 can be arranged to overlap with the stator 12A of the electric motor 12 as viewed in a direction parallel to the first rotational axis C1. As viewed in a direction parallel to the first rotational axis C1, at least a portion of the second gear 26 is arranged to overlap with a region in which the third gear 50 overlaps with the electric motor 12.

Figure 11:
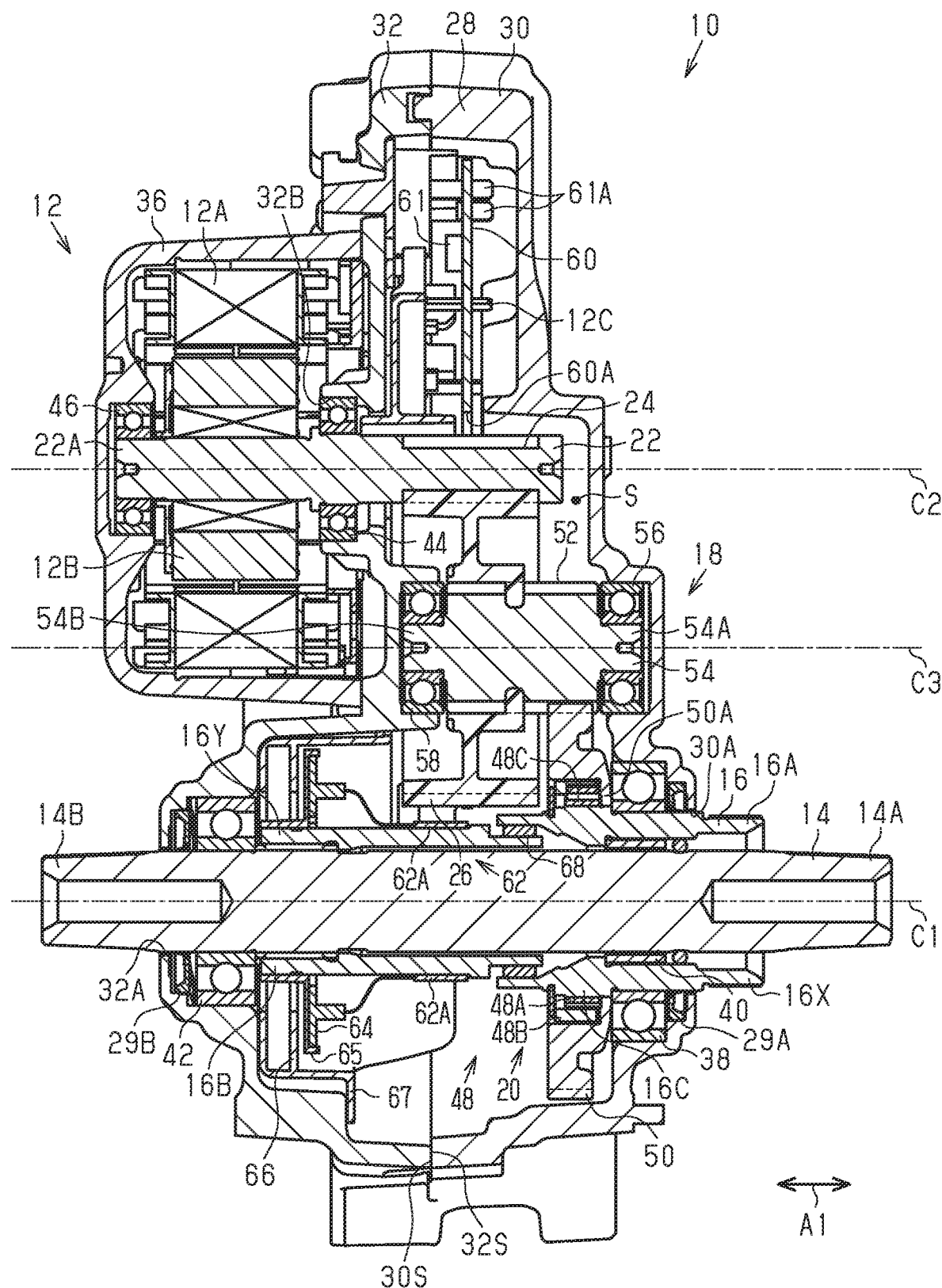
FIG. 11 is a cross-sectional view of a second modified example of a human-powered vehicle drive unit.

As shown in FIG. 11, the drive unit 10 can further include a first one-way clutch 68 provided on the transmission path of human driving force between the crankshaft 14 and the output portion 16. In the modified example shown in FIG. 11, the first one-way clutch 68 is provided on the output portion 16. The output portion 16 is divided into a first part 16X including the first end 16A and a second part 16Y including the second end 16B. The first one-way clutch 68 is provided between the first part 16X and the second part 16Y. The first one-way clutch 68 allows rotation of the second part 16Y about the first rotational axis C1 in the first rotational direction in a case in which the crankshaft 14 rotates in the first rotational direction and prohibits rotation of the second part 16Y about the first rotational axis C1 in the second rotational direction in a case in which the crankshaft 14 rotates in the second rotational direction. The first one-way clutch 68 includes at least one of a one-way roller clutch, a one-way ratchet clutch, and a one-way sprag clutch. In this case, the human driving force detector 62 is provided on the second part 16Y of the output portion 16. A portion of the first one-way clutch 68 can be formed integrally with at least one of the first part 16X and the second part 16Y.

The clutch 20 can be configured to switch a state in which rotational force is transmittable between the output portion 16 and the speed reducer 18 and a state in which the rotational force is not transmittable. In this case, preferably, the drive unit 10 further includes an actuator that actuates the clutch 20, and the actuator is controlled by the controller provided on the circuit board 60 to switch the state of the clutch 20. The clutch 20 can include a two-way clutch instead of a one-way clutch.

The speed reducer 18 can include a configuration that reduces the rotational speed of the electric motor 12 without using gears. The speed reducer 18 can reduce the rotational speed using a pulley and a belt. For example, the third gear 50 and the fourth gear 52 can be replaced with pulleys, and the two pulleys can be coupled by a belt or a chain. The first gear 24 and the second gear 26 can be replaced with pulleys, and the two pulleys can be coupled by a belt or a chain. The speed reducer 18 can include a planetary gear mechanism. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle drive unit comprising:
an electric motor configured to assist in propulsion of a human-powered vehicle;
a crankshaft;
an output portion coupled to the crankshaft, the output portion being configured to rotate in a first rotational direction in a case in which the crankshaft rotates in the first rotational direction, and the output portion being configured to rotate in a second rotational direction in a case in which the crankshaft rotates in the second rotational direction;
a speed reducer configured to reduce a rotational speed of the electric motor in multiple steps, the speed reducer including a first gear and a second gear, the first gear being provided on an output shaft of the electric motor and the second gear being engaged with the first gear;
a clutch provided between the output portion and the speed reducer, the clutch being configured to selectively transmit a rotational force of the electric motor to the output portion via the speed reducer; and
a human driving force detector provided on a transmission path of human driving force between the crankshaft and a part of the output portion that is coupled to the clutch, the human driving force detector being disposed radially between the output portion and the second gear.

2. A human-powered vehicle drive unit comprising:
an electric motor configured to assist in propulsion of a human-powered vehicle;
a crankshaft;
an output portion coupled to the crankshaft;
a speed reducer configured to reduce a rotational speed of the electric motor in multiple steps, the speed reducer including a first gear and a second gear, the first gear being provided on an output shaft of the electric motor and the second gear being engaged with the first gear;
a clutch provided between the output portion and the speed reducer, the clutch being configured to selectively transmit a rotational force of the electric motor from the speed reducer to the output portion; and
a human driving force detector provided on a transmission path of human driving force between the crankshaft and a part of the output portion that is coupled to the clutch, the human driving force detector being disposed radially between the output portion and the second gear.

3. The human-powered vehicle drive unit according to claim 2, further comprising
a one-way clutch provided on a transmission path of a human driving force between the crankshaft and the output portion.

4. The human-powered vehicle drive unit according to claim 1, wherein
the clutch includes a one-way clutch.

5. The human-powered vehicle drive unit according to claim 4, wherein
the speed reducer further includes
a third gear provided on an outer circumferential portion of the one-way clutch, and
a fourth gear engaged with the third gear.

6. The human-powered vehicle drive unit according to claim 1, wherein
the clutch includes a one-way clutch,
the speed reducer further includes a third gear provided on an outer circumferential portion of the one-way clutch, and a fourth gear engaged with the third gear,
the output portion and the third gear are configured to rotate about a first rotational axis,
the output shaft of the electric motor and the first gear are configured to rotate about a second rotational axis that is parallel to the first rotational axis, the second gear and the fourth gear are configured to rotate about a third rotational axis that is parallel to the first rotational axis and the second rotational axis, and the first rotational axis, the second rotational axis, and the third rotational axis are coplanar with each other.

7. The human-powered vehicle drive unit according to claim 1, wherein the clutch includes a one-way clutch, the speed reducer further includes a third gear provided on an outer circumferential portion of the one-way clutch, and a fourth gear engaged with the third gear, the output portion and the third gear are configured to rotate about a first rotational axis, the output shaft of the electric motor and the first gear are configured to rotate about a second rotational axis that is parallel to the first rotational axis, the second gear and the fourth gear are configured to rotate about a third rotational axis that is parallel to the first rotational axis and the second rotational axis, and the third rotational axis is separated from a plane that includes the first rotational axis and the second rotational axis.

8. The human-powered vehicle drive unit according to claim 6, wherein a shortest distance between the first rotational axis and the second rotational axis is greater than a shortest distance between the first rotational axis and the third rotational axis.

9. The human-powered vehicle drive unit according to claim 6, wherein the third gear is offset from the electric motor as viewed in a direction parallel to the first rotational axis.

10. The human-powered vehicle drive unit according to claim 4, wherein the one-way clutch includes at least one of a roller one-way clutch, a ratchet one-way clutch, and a sprag one-way clutch.

11. The human-powered vehicle drive unit according to claim 1, further comprising a circuit board on which at least a portion of an electronic controller is provided, the electronic controller being configured to control the electric motor.

12. The human-powered vehicle drive unit according to claim 11, wherein the circuit board extends in a direction intersecting with an axial direction of the crankshaft.

13. The human-powered vehicle drive unit according to claim 12, wherein the circuit board overlaps with the speed reducer in a direction intersecting with the axial direction of the crankshaft.

14. The human-powered vehicle drive unit according to claim 11, wherein the circuit board includes a recess, and a portion of an output shaft of the electric motor is arranged in the recess.

15. The human-powered vehicle drive unit according to claim 1, further comprising a housing configured to accommodate at least a portion of the crankshaft such that a shortest distance between a rotational axis of the crankshaft and an outer surface of the housing is less than or equal to 70 mm on a plane that includes the rotational axis of the crankshaft and a rotational axis of the electric motor as viewed in an axial direction of the crankshaft.

* * * * *